US009125096B2

(12) United States Patent
Patil et al.

(10) Patent No.: US 9,125,096 B2
(45) Date of Patent: *Sep. 1, 2015

(54) METHOD AND APPARATUS FOR REDUCING INTERFERENCE IN A WIRELESS SYSTEM

(75) Inventors: Shailesh Patil, Bridgewater, NJ (US); Hua Wang, Basking Ridge, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 262 days.

This patent is subject to a terminal disclaimer.

(21) Appl. No.: 13/464,820

(22) Filed: May 4, 2012

(65) Prior Publication Data

US 2013/0295976 A1 Nov. 7, 2013

(51) Int. Cl.
| | | |
|---|---|---|
| H04W 72/00 | (2009.01) | |
| H04B 1/00 | (2006.01) | |
| H04B 17/00 | (2015.01) | |
| H04W 24/10 | (2009.01) | |
| H04W 76/02 | (2009.01) | |
| H04L 5/00 | (2006.01) | |

(52) U.S. Cl.
CPC ............ *H04W 24/10* (2013.01); *H04L 5/0062* (2013.01); *H04W 76/023* (2013.01)

(58) Field of Classification Search
CPC .... H04W 24/10; H04W 72/08; H04L 5/0035; H04L 5/0062; H04L 1/0048; H04B 17/005; H04B 17/00672
USPC .............. 455/63.1, 67.11, 67.13, 452.2, 509, 455/522, 450, 501; 370/252, 330
See application file for complete search history.

(56) References Cited

U.S. PATENT DOCUMENTS

| | | | | |
|---|---|---|---|---|
| 8,060,105 | B2* | 11/2011 | Jung et al. .................. | 455/452.2 |
| 8,504,052 | B2* | 8/2013 | Hakola et al. .............. | 455/452.1 |
| 2007/0147236 | A1* | 6/2007 | Lee ................................ | 370/229 |
| 2011/0170440 | A1 | 7/2011 | Gaal et al. | |

(Continued)

FOREIGN PATENT DOCUMENTS

| | | |
|---|---|---|
| WO | 2010097645 A1 | 9/2010 |
| WO | 2011069295 A1 | 6/2011 |

(Continued)

OTHER PUBLICATIONS

Tao Peng et al., "Interference avoidance mechanisms in the hybrid cellular and device-to-device systems", IEEE 20th International Symposium on Personal, Indoor and Mobile Radio Communications (PIMRC 2009), IEEE, Piscataway, NJ, USA, Sep. 13, 2009, pp. 617-621, XP031659660, ISBN: 978-1-4244-5122-7 abstract, chapters I, II, III.

(Continued)

*Primary Examiner* — Simon Nguyen
(74) *Attorney, Agent, or Firm* — James K. O'Hare

(57) ABSTRACT

Techniques for performing interference reduction are described. In a design of an apparatus, system, method and computer program of the present disclosure, a mobile device may at least partially identify an interfering resource using at least energy received from the interfering resource, and the mobile device may report the interfering resource to a base station for mitigation of the interference. The identifying may include extracting, from the received energy, information distinguishing the interfering resource from other devices. The interfering resource may interfere in one of a communication time slot, and a communication frequency.

26 Claims, 12 Drawing Sheets

(56) References Cited

U.S. PATENT DOCUMENTS

| | | |
|---|---|---|
| 2011/0243010 A1 | 10/2011 | Geirhofer et al. |
| 2012/0014334 A1* | 1/2012 | Oh et al. ............... 370/329 |
| 2012/0044815 A1 | 2/2012 | Geirhofer et al. |
| 2012/0115518 A1* | 5/2012 | Zeira et al. ............ 455/500 |
| 2012/0236736 A1* | 9/2012 | Frank et al. ........... 370/252 |
| 2012/0243431 A1* | 9/2012 | Chen et al. ............ 370/252 |
| 2012/0257519 A1* | 10/2012 | Frank et al. ........... 370/252 |
| 2013/0115999 A1* | 5/2013 | Sirotkin et al. ........ 455/522 |
| 2013/0170360 A1* | 7/2013 | Xu et al. ............... 370/241 |
| 2013/0288737 A1* | 10/2013 | Nentwig et al. ........ 455/522 |
| 2013/0301422 A1* | 11/2013 | Caretti et al. .......... 370/241 |
| 2014/0024388 A1* | 1/2014 | Earnshaw et al. ...... 455/452.2 |
| 2014/0050128 A1* | 2/2014 | Campoy Cervera et al. . 370/280 |
| 2014/0071848 A1* | 3/2014 | Park et al. ............. 370/252 |
| 2014/0160967 A1* | 6/2014 | Gao et al. .............. 370/252 |

FOREIGN PATENT DOCUMENTS

| | | |
|---|---|---|
| WO | WO-2012015698 A1 | 2/2012 |
| WO | WO-2012034268 A1 | 3/2012 |

OTHER PUBLICATIONS

International Search Report and Written Opinion—PCT/US2013/039568, International Search Authority—European Patent Office, Sep. 30, 2013.

* cited by examiner

METHOD AND APPARATUS FOR REDUCING INTERFERENCE IN A WIRELESS SYSTEM

BACKGROUND

I. Field

The present disclosure relates generally to telecommunications, and more specifically to techniques for supporting peer-to-peer (P2P) communication.

II. Background

Wireless communication networks are widely deployed to provide various types of communication content, such as voice, video, packet data, messaging, broadcast, etc. Wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks. A wireless communication network may also be referred to as a wide area network (WAN).

A wireless communication network may include a number of base stations (also referred to as evolved node Bs, eNBs, or access nodes) that can support communication for a number of user equipments (UEs). In a WAN, communication by UEs typically occurs via uplink/downlink channels between the UEs and a base station. A UE is thus enabled to communicate with a base station.

However, if two UEs are in the vicinity of each other, they may be enabled to communicate directly, that is, without communicating through the base station. A UE may thus be enabled to communicate peer-to-peer (P2P), also referred to as device-to-device (D2D), with one or more other UEs.

It may be desirable to efficiently support P2P communication for UEs, such as by enabling new types of services, improving available services, eliminating interference, and/or reducing the traffic load on base stations.

SUMMARY

The present disclosure provides techniques for reducing interference in a wireless system.

In an apparatus, system, method and computer program of the present disclosure, a mobile device may at least partially identify an interfering resource using at least energy received from the interfering resource, and may report the interfering resource to a base station for mitigation of the interference. The identifying may include extracting, from the received energy, information distinguishing the interfering resource from other devices. The interfering resource may interfere in one of a communication time slot, and a communication frequency.

In an additional design of an apparatus, system, method and computer program of the present disclosure, a base station may receive information regarding interference disturbing direct wireless communication between two mobile communication devices, may identify a source of the interference based on the received information, and may instruct the source of the interference to modify communications to mitigate the interference. The identifying of the interfering device may be based on location information of the source and location information of the one of the two mobile communication devices disturbed by the interference. The instructed modification may be to reduce transmit power level of the source, to transmit future communication on a different resource block of a control channel than that used by the source for past communication, to transmit future communication on a different subframe of a control channel than that used by the source for past communications, and/or to transmit future communication using a different subset of subframes of a control channel than that used by the source for past communications, for example.

In an additional design of an apparatus, system, method and computer program of the present disclosure, a first user equipment directly communicating, absent intervening devices and using uplink resources, with a second user equipment, may experience interference from a third user equipment communicating with a base station that degrades the direct communication between the first user equipment and the second user equipment, and may report identifying characteristics of the third user equipment to the base station for mitigation by the base station of the interference.

Various aspects and features of the disclosure are described in further detail below.

DETAILED DESCRIPTION

The figures and descriptions of the disclosure have been simplified to illustrate elements that are relevant for clear understanding, while eliminating, for the purposes of clarity and brevity, other elements found in typical telecommunications apparatuses, systems, and methods. Those of ordinary skill in the art will thus recognize the other elements and/or steps that are desirable and/or required in implementing the disclosure. However, because such elements and steps are well known in the art, and because they do not facilitate a better understanding of the present invention, a discussion of such elements and steps is not provided herein. The disclosure herein is nevertheless directed to all variations and modifications to the disclosed elements and steps that will be known or apparent to those skilled in the art in light of this disclosure.

The techniques described herein may be used for various wireless communication networks, such as CDMA, TDMA, FDMA, OFDMA, SC-FDMA, and other wireless networks. The terms "network" and "system" are often used interchangeably herein. By way of example, a CDMA network may implement a radio technology such as Universal Terrestrial Radio Access (UTRA), cdma2000, and the like. UTRA includes Wideband CDMA (WCDMA), Time Division Synchronous CDMA (TD-SCDMA), and other variants of CDMA, and cdma2000 covers IS-2000, IS-95, and IS-856 standards. A TDMA network may implement a radio technology, such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, and the like. UTRA and E-UTRA are part of Universal Mobile Telecommunication System (UMTS). 3GPP Long Term Evolution (LTE) and LTE-Advanced (LTE-A), in both Frequency Division Duplex (FDD) and Time Division Duplex (TDD), are new releases of UMTS that use E-UTRA. UTRA, E-UTRA, UMTS, LTE, LTE-A and GSM are described in documents from an organization named "3rd Generation Partnership Project" (3GPP). UMB and cdma2000 are described in documents from an organization named "3rd Generation Partnership Project 2" (3GPP2). The techniques described herein may be used for the wireless networks and radio technologies mentioned above, as well as for other wireless networks and radio technologies.

Figure 1:
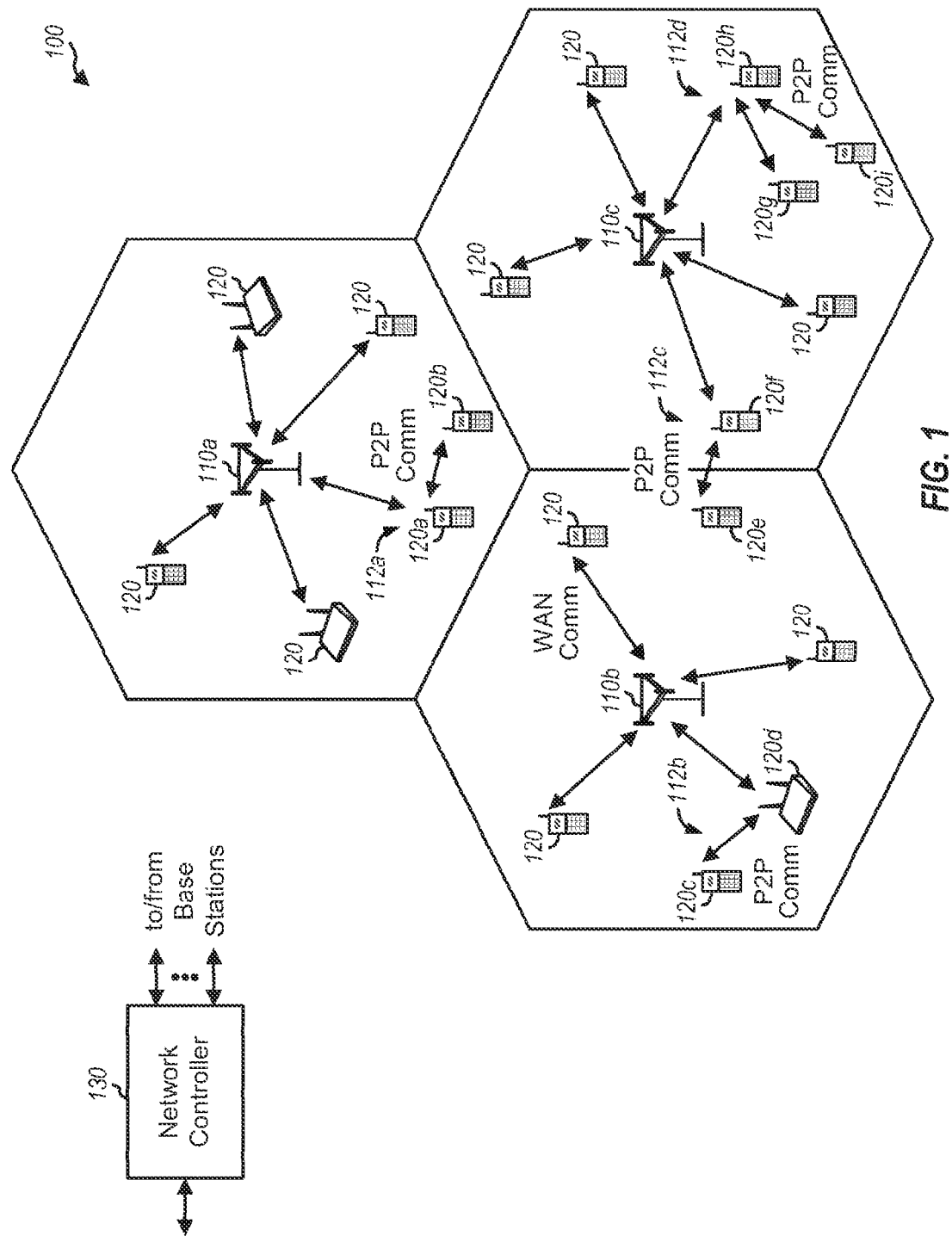
FIG. 1 shows a wireless network supporting P2P communication according to one embodiment.

FIG. 1 shows a wireless WAN 100, which may be an LTE network or other WAN. WAN 100 may include a number of base stations and other network entities. For simplicity, only three base stations 110a, 110b, and 110c and one network controller 130 are shown in FIG. 1. A base station may communicate with the UEs, and may also be referred to as a Node B, an evolved Node B (eNB), an access point, or the like. Each base station may provide communication coverage for a particular geographic area and may support communication for the UEs located within the coverage area. In 3GPP, the term "cell" can refer to a coverage area of a base station and/or a base station subsystem serving this coverage area, depending on the context in which the term is used. In 3GPP2, the term "sector" or "cell-sector" can refer to a coverage area of a base station and/or a base station subsystem serving this coverage area. For clarity, the 3GPP concept of "cell" is typically used in the description herein.

A base station may provide communication coverage for a macro cell, a pico cell, a femto cell, and/or other types of cells. A macro cell may cover a relatively large geographic area (e.g., several kilometers in radius) and may allow unrestricted access by UEs with a service subscription. A pico cell may cover a relatively small geographic area and may allow unrestricted access by UEs with a service subscription. A femto cell may cover a relatively small geographic area (e.g., a home) and may allow for restricted access by UEs having association with the femto cell (e.g., UEs in a Closed Subscriber Group (CSG)). In the example shown in FIG. 1, WAN 100 includes macro base stations 110a, 110b, and 110c for correspondent macro cells. WAN 100 may also include pico base stations for pico cells, and/or home base stations for femto cells (not shown in FIG. 1).

WAN 100 may also include relays. A relay may be an entity that receives a transmission of data from an upstream entity (e.g., a base station, a UE, or a superordinate relay station) and sends a transmission of the data to a downstream entity (e.g., a UE, a base station, or a subordinate relay station). A relay may also be a UE that relays transmissions for other UEs. Although much of the discussion herein may be made without reference to relays, those skilled in the art will nevertheless appreciate that relays may be included in the networks, cells, and systems herein described.

WAN 100 may be a heterogeneous network (HetNet) that includes base stations of different types, e.g., macro base stations, pico base stations, home base stations, relays, and the like. These different types of base stations may have different transmit power levels, different coverage areas, and different impact on interference in WAN 100. For example, macro base stations may have a high transmit power level (e.g., 5 to 40 Watts), whereas pico and home base stations may have a lower transmit power level (e.g., 0.1 to 2 Watts). Different types of base stations may belong in different power classes having different maximum transmit power levels.

Network controller 130 may couple to a set of base stations, and may provide coordination and control for these base stations. Network controller 130 may communicate with the base stations via a backhaul. The base stations may also communicate with one another via the backhaul.

UEs 120 may be dispersed throughout WAN 100, and each UE may be stationary or mobile. A UE may also be referred to as a station, a mobile station, a terminal, an access terminal, a subscriber unit, or the like. A UE may be, by way of non-limiting example, a cellular phone, a personal digital assistant (PDA), a wireless modem, a wireless communication device, a handheld device, a laptop computer, a cordless phone, a wireless local loop (WLL) station, a smart phone, a netbook, a smartbook, a tablet, or the like. A UE may be able to communicate with base stations, relays, and other UEs, for example.

In the description herein, WAN communication refers to communication between a UE and a base station, such as for a call between the UE and a remote entity, such as another UE, via the base station. A WAN link and variants thereof, as used herein, thus refers to a communication link between a UE and a base station.

In contrast, a P2P communication, as used herein, refers to direct communication between two or more UEs, wherein the direct communication occurs without going through a base station. A P2P link, or variants thereof, thus refers to a direct communication link between two or more UEs engaged in P2P communication. Correspondingly, a WAN UE is a UE that is interested or engaged in WAN communication, and a P2P UE is a UE that is interested or engaged in P2P communication.

A P2P group refers to a group of two or more UEs engaged in P2P communication. In one design, one UE in the P2P group may be designated as a P2P server (or a P2P group owner), and each remaining UE in the P2P group may be designated as a P2P client. The P2P server may perform certain management functions, such as exchanging signaling with a WAN, coordinating data transmission between the P2P server and the P2P client(s), and the like.

In the example shown in FIG. 1, a P2P group 112a includes UEs 120a and 120b under the coverage of base station 110a. A P2P group 112b includes UEs 120c and 120d under the coverage of base station 110b. A P2P group 112c includes UEs 120e and 120f under the coverage of different base stations 110b and 110c. A P2P group 112d includes UEs 120g, 120h, and 120i under the coverage of base station 110c.

UEs 120a, 120c, 120e, and 120h may be P2P servers for P2P groups 112a, 112b, 112c and 112d, respectively. UEs 120b, 120d, 120f, 120g, and 120i may be P2P clients in their respective P2P groups. The other UEs 120 in FIG. 1 may be engaged in WAN communication.

In the description herein, a server node is used to refer to an entity capable of serving a UE. A server node may be, for example, a base station, a P2P server, or the like. More generally, a node may be any entity capable of transmitting, such as a base station, a UE, a P2P server, a P2P client, or the like.

In general, communication in the illustrated network may be facilitated via transmissions on the downlink and uplink. For WAN communication, the downlink (or forward link) refers to the communication link from base stations to UEs, and the uplink (or reverse link) refers to the communication link from UEs to base stations. Thus, for P2P communication, P2P downlink refers to the communication link from P2P servers to P2P clients, and P2P uplink refers to the communication link from P2P clients to P2P servers.

P2P communication may offer certain advantages over WAN communication, particularly for UEs located close to each other. In particular, efficiency for P2P communication may improve, at least because the path loss between two UEs may be substantially smaller than the path loss between, for example, a UE and its respective serving base station. Furthermore, two UEs may communicate directly via a single transmission "hop" for P2P communication, instead of via two separate transmission hops for WAN communication (one hop for the uplink from one UE to its serving base station and another hop for the downlink from the same or different base station to the other UE).

In general, P2P communication may be supported on the same channels used by WAN 100 in a co-channel P2P deployment (though not necessarily at the same time), or on different channels not used by WAN 100. Co-channel P2P deployment may be used, for example, when a separate channel is not available to support P2P communication.

FDD and TDD are two prevalent duplexing schemes used in LTE wireless networks, as referenced above. FDD, which historically has been used in voice-only applications, supports two-way radio communication, i.e., two different "hops," as referenced above, by using two distinct radio channels. Because of the pairing of frequencies of the distinct radio channels, simultaneous transmission in two directions is possible, although to mitigate self-interference between uplink and downlink transmissions a minimum amount of frequency separation is typically maintained between the frequency pair. In contrast, TDD uses a single frequency to transmit signals in both the uplink and downlink.

WAN 100 may utilize, for example, FDD, and may thus have separate frequency channels for the downlink and uplink. In this case, for a co-channel P2P deployment, some time frequency resources (e.g., resource blocks) on the uplink frequency channel may be allocated for P2P communication. Alternatively, WAN 100 may utilize TDD, and may thus have a single channel for both the downlink and uplink. Some subframes may be allocated for the downlink, and the remaining subframes may be allocated for the uplink. In this case, for a co-channel P2P deployment, some time frequency resources (e.g., resource blocks) in the uplink subframes may be allocated for P2P communication.

In general, WAN 100 may have downlink resources used for transmission on the downlink and uplink resources used for transmission on the uplink. In general, the downlink resources and uplink resources may comprise different frequency and/or time resources. P2P communication may be typically supported on the uplink resources instead of the downlink resources. This is because P2P transmissions on downlink resources would require UEs to transmit on the downlink, which may not be allowed by regulatory bodies in many countries.

Figure 2:
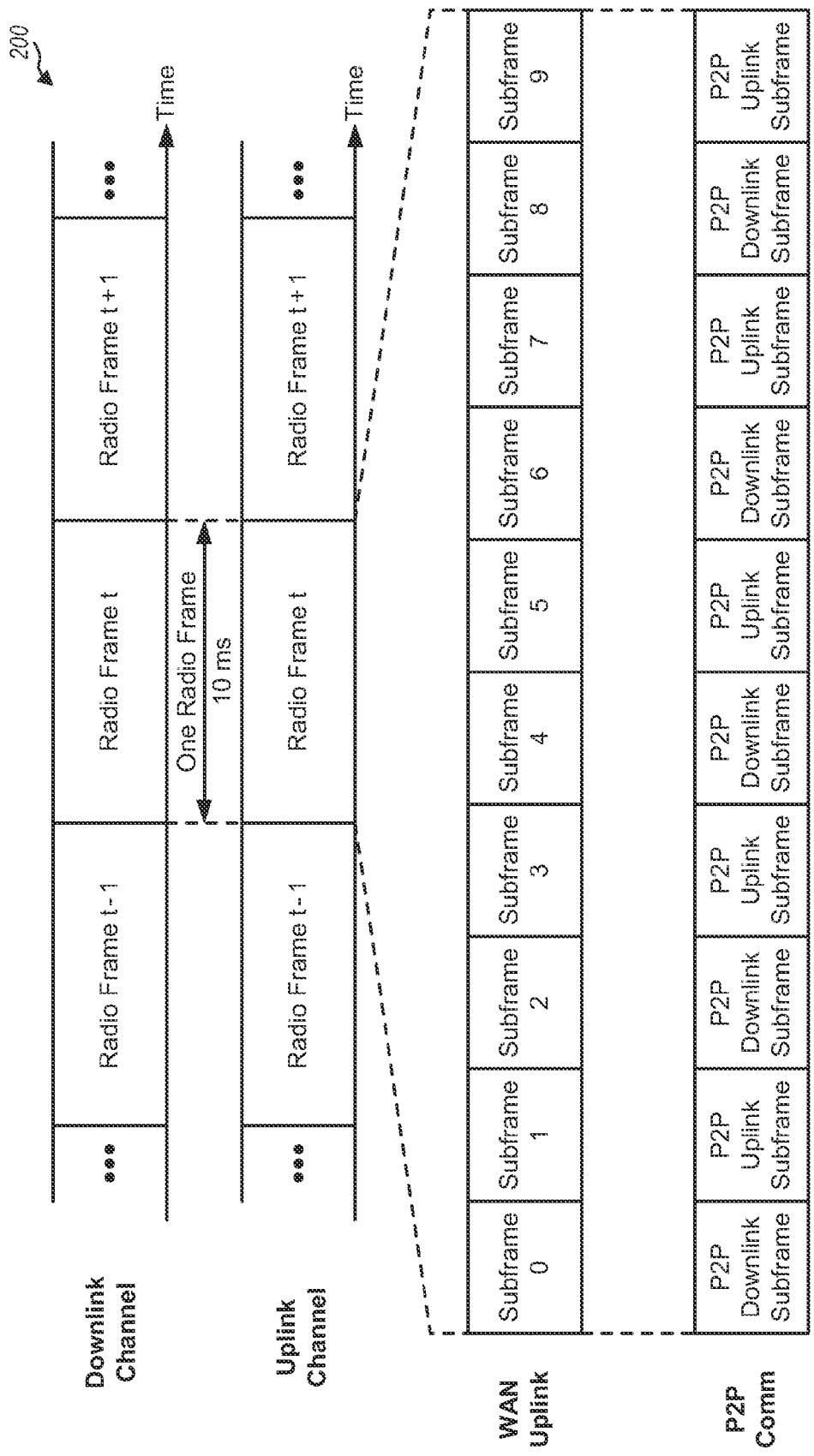
FIG. 2 shows a frame structure for frequency division duplexing (FDD) according to one embodiment.

FIG. 2 shows an exemplary frame structure 200 for FDD in LTE. As referenced above, for FDD, two separate channels may be used for the downlink and uplink. The transmission timeline for each of the downlink and uplink may be partitioned into units of radio frames. Each radio frame may have a predetermined duration (e.g., 10 milliseconds (ms)), and may be partitioned into 10 subframes with indices of 0 through 9. Each LTE subframe may include two slots. Each slot may include L symbol periods, e.g., seven symbol periods for a normal cyclic prefix or six symbol periods for an extended cyclic prefix. Furthermore, each slot may include a plurality of resource blocks (RBs). In one embodiment, each slot is broken into fifty resource blocks, with each resource block including the L symbol periods and twelve different subcarriers (also referred to as tones). The 2L symbol periods in each subframe may be assigned indices of 0 through 2L−1.

LTE utilizes orthogonal frequency division multiplexing (OFDM) on the downlink and single-carrier frequency division multiplexing (SC-FDM) on the uplink. OFDM and SC-FDM partition a frequency range into multiple ($N_{FFT}$) orthogonal subcarriers, which are also commonly referred to as tones or bins, for example. Each subcarrier may be modulated with data. In general, modulation symbols are created in the frequency domain with OFDM and in the time domain with SC-FDM. The spacing between adjacent subcarriers may be fixed, and the total number of subcarriers ($N_{FFT}$) may be dependent on the system bandwidth. For example, $N_{FFT}$ may be equal to 128, 256, 512, 1024, or 2048 for system bandwidth of 1.25, 2.5, 5, 10, or 20 megahertz (MHz), respectively. The system bandwidth may also be partitioned into subbands. Each subband may cover a range of frequencies, such as, for example, a range of frequencies spanning 1.08 MHz.

The available subcarriers and symbol periods for each of the downlink and uplink may be partitioned into RBs. Each RB may cover 12 subcarriers (tones) in one slot and have a duration of L symbol periods (e.g., seven symbol periods), and may include a number of resource elements. Each resource element may consist of one subcarrier in one symbol period and may be used to send one modulation symbol, which may be a real or complex value.

FIG. 2 also shows a design of supporting P2P communication in an FDD deployment. In this design, the P2P downlink and P2P uplink may be supported using TDD. Hence, some subframes for the uplink may be used for the P2P downlink and may be referred to as P2P downlink subframes. Some other subframes for the uplink may be used for the P2P uplink and may be referred to as P2P uplink subframes.

Figure 3:
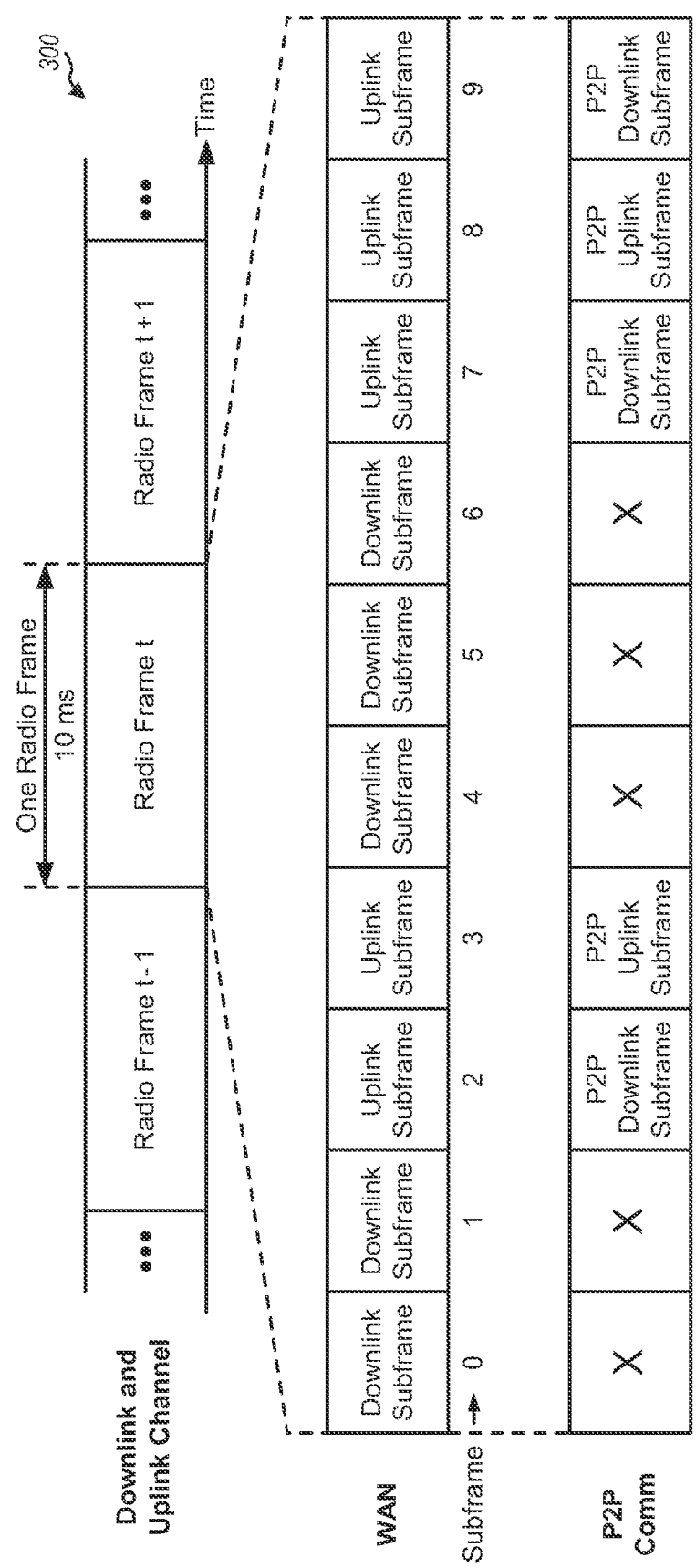
FIG. 3 shows a frame structure for time division duplexing (TDD) according to one embodiment.

FIG. 3 shows an exemplary frame structure 300 for TDD in LTE. For TDD, a single frequency channel may be used for both the downlink and uplink. The transmission timeline may be partitioned into units of radio frames, and each radio frame may be partitioned into 10 subframes with indices of 0 through 9. Subframes 0 and 5 may be used for the downlink, and subframe 2 may be used for the uplink. The remaining subframes 1, 3, 4, 6, 7, 8 and 9 may each be used for the downlink or uplink, or as a special subframe. In the example shown in FIG. 3, subframes 1, 4 and 6 are used for the downlink, and subframes 3, 7, 8 and 9 are used for the uplink, for example.

FIG. 3 also shows a design of supporting P2P communication in a TDD deployment. In this design, the P2P downlink and P2P uplink may be supported using TDD. Hence, some subframes for the uplink may be used for the P2P downlink, and some other subframes for the uplink may be used for the P2P uplink.

FIGS. 2 and 3 show exemplary designs of supporting P2P communication on uplink resources in FDD and TDD deployments, respectively. In these designs, transmissions from P2P servers to P2P clients may be sent in P2P downlink subframes, and transmissions from P2P clients to P2P servers may be sent in P2P uplink subframes. P2P communication may also be supported on uplink resources in other manners. FIGS. 2 and 3 show examples in which each subframe for the uplink is designated as a P2P downlink subframe or a P2P uplink subframe. In general, a given subframe for the uplink may or may not be used for P2P communication and may be used for only P2P downlink, or only P2P uplink, or both P2P downlink and P2P uplink.

In a co-channel P2P deployment, WAN transmissions and P2P transmissions may be sent on adjacent frequency resources, and thus may cause significant interference to one another. Likewise, these WAN and P2P transmissions may be on the same time resources, or may occur to/from similar geographically proximate locations, and thereby may cause significant interference to one another. Accordingly, the interference management techniques discussed herein may be performed to mitigate interference between P2P links and WAN links in a P2P deployment.

Thus, in an aspect of the disclosure, interference management may be performed in a coordinated manner for/by one or more server nodes in order to mitigate interference to P2P UEs. Interference management may be performed by the server node(s) using various interference mitigation techniques, such as association, resource partitioning, power control, and the like. Association may entail determining whether UEs should communicate peer-to-peer or via the WAN. Resource partitioning may entail allocating different resources and/or coordinating transmissions on orthogonal or quasi-orthogonal resources in time, frequency, spatial, and/or code domain in order to mitigate interference. Power control may entail setting the transmit power levels or target load levels of nodes in order to reduce interference.

In one design, active sets and neighbor sets may be defined and used, at least for identification purposes, to allow for the disclosed interference management. Active sets may be defined for WAN UEs and P2P UEs on a per UE basis. Neighbor sets may be defined on a per server node basis, such as, for example, for each base station and each P2P server. The active sets and/or neighbor sets may also be referred to by other names, as will be understood to those skilled in the art.

In one design, an active set for a particular UE may include nodes having signals that may be received with sufficient signal strength by the UE so as to communicate with, and/or cause significant interference to, the UE. Significant interference may be quantified by an amount of interference exceeding a particular target level. This target level may be dependent on the amount of residual interference that is targeted by the interference mitigation technique being employed, and may thus vary from affecting the quality of communications to altogether preventing communications.

Figure 4:
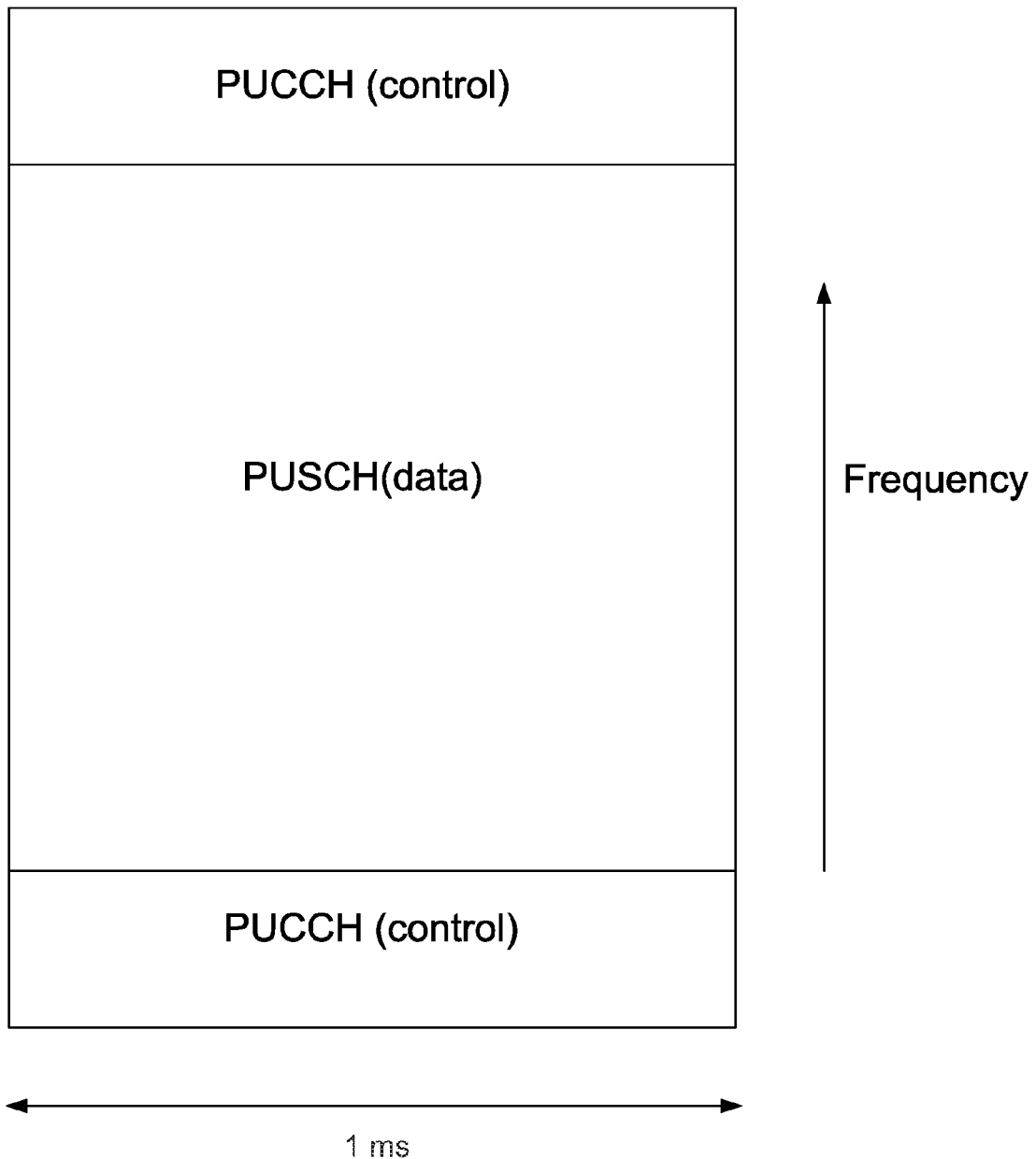
FIG. 4 illustrates a 1 ms LTE subframe according to one embodiment.

FIG. 4 illustrates a 1 ms LTE subframe. In the illustrated subframe, the Physical Uplink Control Channel (PUCCH), which carries control information for the UE, is typically provided at frequencies above and below the Physical Uplink Channel Shared (PUSCH), which carries user data, provided within the 1 ms subframe. Typically, the PUCCH is periodic over subframes, and as such is difficult to remove over a series of subframes. As discussed above in relation to FIG. 2, each subframe may be divided into two time slots.

Figure 5:
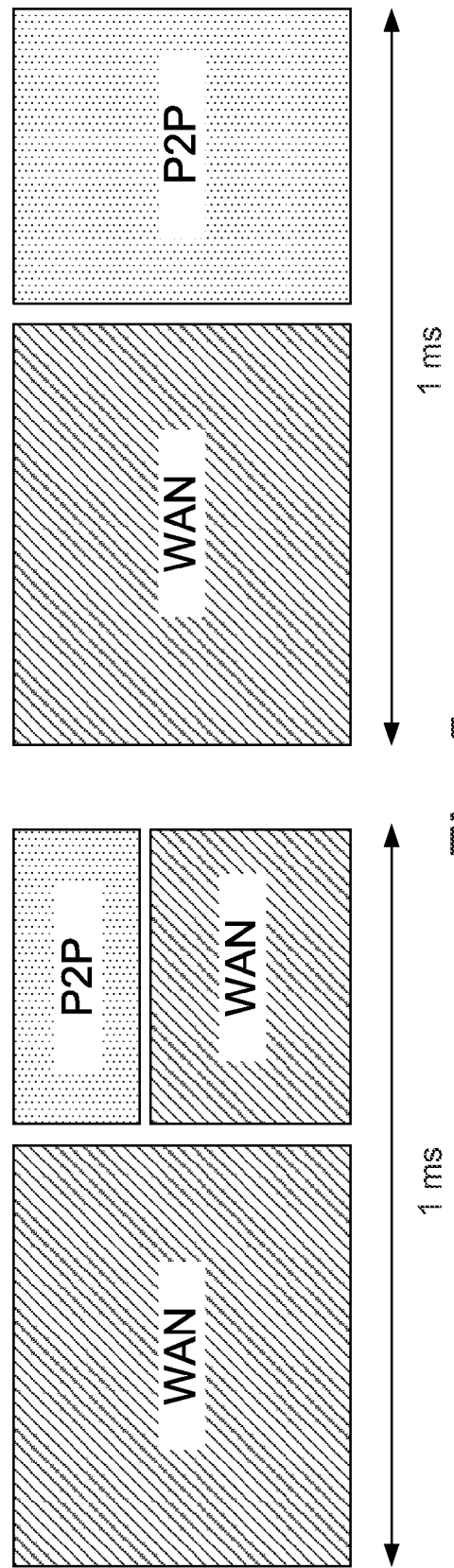
FIG. 5 shows two ways of partitioning subframe resources to enable simultaneous P2P and WAN communications in LTE according to one embodiment.

FIG. 5 shows two ways of partitioning subframe resources, and in particular of allotting resources within a subframe, to enable simultaneous P2P and WAN communications in LTE. More particularly, to enable P2P communications, a WAN base station may set aside time/frequency resources for P2P communication, as referenced above with respect to FIGS. 2 and 3, using the allocation shown in FIG. 5. The P2P resources may be set aside on the downlink, or on the uplink, or on both. Most typically, P2P resources are allocated on the uplink.

As illustrated, resources may be partitioned between WAN and P2P in two ways, namely using solely time division multiplexing (TDM), as illustrated on the right; and using TDM/FDM (time domain multiplexing/frequency division multiplexing), as illustrated on the left. More particularly, in the two slots shown in the subframe at right, the first slot (slot A) comprises the WAN communication slot, and the second slot (slot B) comprises the P2P communication slot. In the two slots of the subframe at left, slot A comprises the WAN communication slot, and slot B comprises a frequency multiplex of both P2P and WAN communication. Typically, TDM is preferred because the combined use of TDM/FDM in the uplink often leads to desensing or interference at the P2P device.

Figure 6:
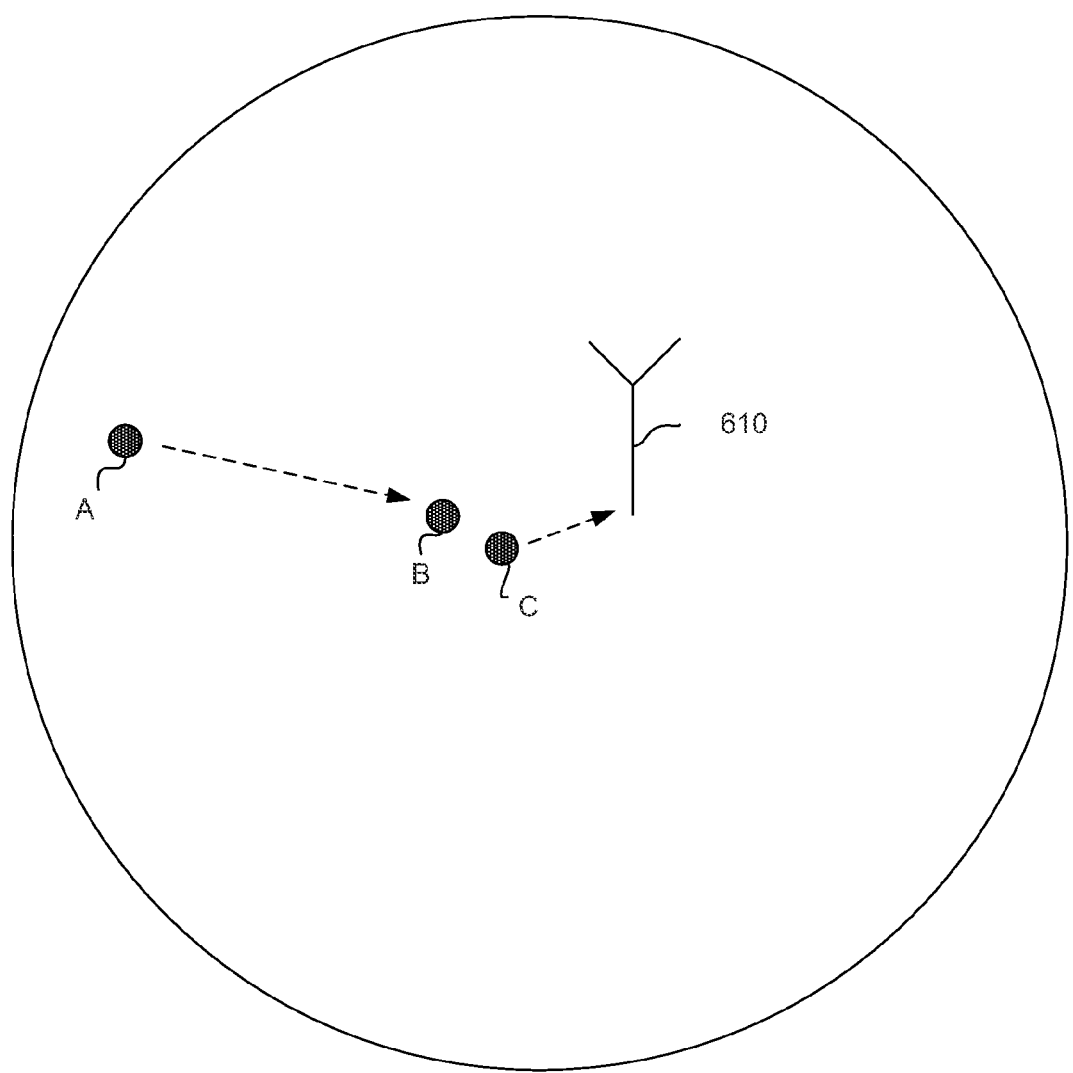
FIG. 6 shows a scenario in which a UE causes strong interference, illustrating reasons that TDM-only is typically preferred for WAN/P2P partitioning in LTE according to one embodiment.

FIG. 6 illustrates, with particularity, the reasons that TDM-only is typically preferred for WAN/P2P partitioning in LTE. As shown, devices A and C are illustratively transmitting, at the same time and on different frequency resources, on the uplink spectrum. In this example, device C is transmitting a conventional WAN signal to the base station 610 using a first resource block, and device A is transmitting a P2P signal (i.e., is transmitting absent intervening devices) to device B on a second resource block that is very close in frequency to the first resource block. More specifically, as the P2P communication occurs between device A and device B, the base station 610 is not participating, and should not be participating in this example, in the direct communication between the two P2P devices. However, because device C is much closer to device B than is device A, device C's signal can easily desense B's receiver and/or interfere with device A's signal at device B, particularly if a given timeslot includes resource blocks dedicated to both WAN and P2P communications. Hence, TDM is typically the preferred partitioning approach.

However, in a LTE uplink, it is difficult to partition a subframe for WAN and P2P communication using TDM, in part because it is difficult to remove the uplink control channel, PUCCH, from an uplink subframe, as referenced above. More particularly, the PUCCH channel carries various information from the UE to the base station. This information includes non-periodic information, such as a HARQ (hybrid automatic repeat request) ACK/NACK, but also includes significant periodic information, such as scheduling request, CQI (channel quality indicator), PMI (precoding matrix indicator), and RI (Ranking Indicator). The periodicity of the periodic PUCCH information makes removal of the PUCCH channel difficult. For example, if subframes 0, 8, 16, 24, . . . are designated for P2P communication, and the base station is to schedule a UE to transmit its CQI for WAN every 2 subframes, and, if the UE is not to transmit its WAN-CQI on the subframes designated for P2P communication, i.e., if TDM is employed, only odd subframes can be used for the WAN-CQI transmissions because subframes 0, 8, 16, 24, . . . must be avoided due to the designation of those subframes for P2P. Simply put, all even subframes must be avoided in the foregoing example, due to the use of some of the even subframes for the P2P communication. This would hold true even were the CQI to be transmitted at a periodicity of 4, or at any other periodicity greater than 1, subframes. In any such case, half the subframes cannot be used for WAN-CQI transmissions, or for any other periodic information transmitted on the PUCCH including scheduling requests, RI, and PMI, due to the designation of P2P subframes. Moreover, because the size of the resource allocated for PUCCH cannot be varied from subframe to subframe, there will further be several subframes that are designated for WAN communication but for which the PUCCH resource will be wasted.

Thus, if TDM partitioning is used on the uplink to partition between P2P and WAN communication, severe restrictions arise regarding the use of PUCCH resources, causing a significant waste of PUCCH resources. Because of this waste when using TDM partitioning between P2P and WAN, it may be preferable, in accordance with this disclosure, to use TDM/FDM partitioning between WAN (PUCCH) and P2P resources in LTE. However, as illustrated in the foregoing discussion, the use of TDM/FDM in the typical manner is likely to lead to interference with the P2P communication from the WAN communication at a periodicity correspondent to the period of the PUCCH transmission. Thereby, as discussed above, device C's periodic PUCCH transmissions will significantly disrupt device B's capability to receive P2P communication using known TDM/FDM partitioning and techniques.

Figure 7:
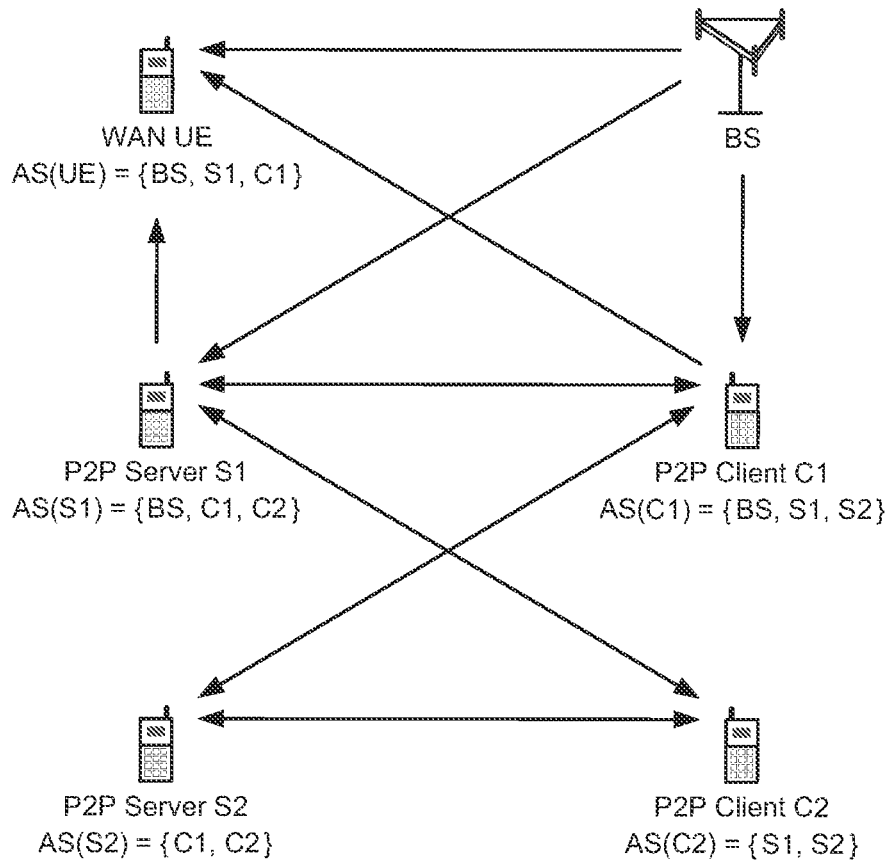
FIG. 7 shows an example of determining active sets of UEs according to one embodiment.

FIG. 7 illustrates an example of the determination of active sets of UEs. In this example, active sets, as referenced above, are determined based on downlink signals (e.g., synchronization signals and/or reference signals) transmitted by base stations in WAN 100, and also based on P2P signals (e.g., proximity detection signals) transmitted by P2P UEs. Illustrated is a scenario with one base station (BS) communicating with one WAN UE, and two P2P servers, S1 and S2, communicating with two P2P clients, C1 and C2, respectively.

A UE may, for example, perform peer discovery in order to detect the presence of other UEs, such as for inclusion in an active set. For peer discovery, the UE may: (i) transmit a proximity detection signal (PDS) to indicate the presence of the UE; and/or (ii) detect proximity detection signals from other UEs. Peer discovery may be performed by UEs interested in P2P communication, such as, for example, P2P UEs. Peer discovery may also be performed by UEs not currently interested in P2P communication, e.g., WAN UEs with P2P capability, but rather currently engaged in WAN communication. Peer discovery may be performed by some WAN UEs (instead of all WAN UEs), but may not be performed dynamically, which may limit the amount of overhead needed to support peer discovery by WAN UEs. Peer discovery might not be supported by legacy UEs, which may be unable to receive P2P signals on uplink resources.

Nodes may be added to an active set of a UE based on various criteria, such as received signal strength. Received signal strength may be given by a channel gain, a channel gain difference (chan_diff), a carrier-to-thermal ratio (C/T), and the like. In the example illustrated in FIG. 7, the active set (AS) of the WAN UE may include the base station (BS), P2P server S1, and P2P client C1, or AS (UE)={BS, S1, C1}. The active set of P2P server S1 may include the base station and P2P clients C1 and C2, or AS (S1)={BS, C1, C2}. The active set of P2P client C1 may include the base station and P2P servers S1 and S2, or AS (C1)={BS, S1, S2}. The active set of P2P server S2 may include P2P clients C1 and C2, or AS (S2)={C1, C2}. The active set of P2P client C2 may include P2P servers S1 and S2, or AS (C2)={S1, S2}.

The active sets of the WAN UEs and P2P clients may be sent to the serving base stations and P2P servers, respectively. The active sets collected by the base stations and P2P servers may be exchanged with other network entities (for example, other base stations) via the backhaul, and may be used to determine neighbor sets.

A neighbor set for a server node may include neighbor server nodes that may interfere with each other. In one design, a neighbor set may be defined based on jamming conditions, or identification of PUCCH resources. For example, two server nodes may be neighbors if there exists a UE that is communicating with one server node and has the other server node in its active set. The neighbor sets of server nodes may be determined based on the active sets of UEs. Active sets and neighbor sets may also be determined in other manners in addition to those stated above, as will be understood to those skilled in the art.

Figure 8:
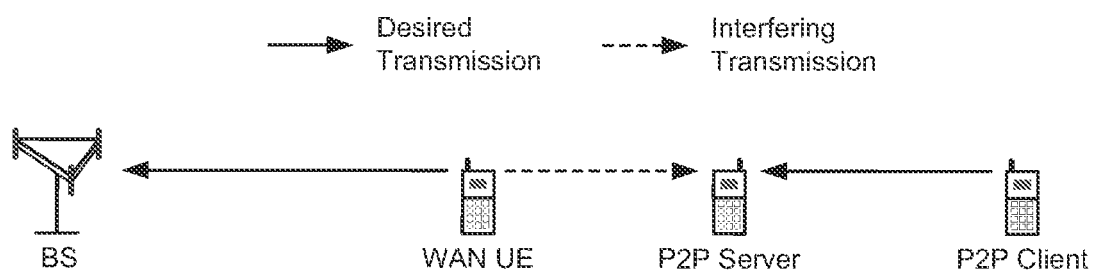
FIG. 8 shows a scenario in which a UE causes strong interference according to one embodiment.

FIG. 8 shows a scenario in which a UE causes strong interference to a P2P server, along with a simple corrective technique for this interference in accordance with the instant disclosure. In this scenario, the UE may communicate with a serving base station BS and may be located relatively close to the P2P server. In the illustrated embodiment, the WAN UE may be in the active set of the P2P server, and as such may be identifiable by the P2P server. Each of the P2P server and the WAN UE may be in the neighbor set of the serving base station. The P2P server may communicate with a P2P client. The WAN UE may send an uplink transmission to its serving base station, and this uplink transmission may cause strong interference to the P2P server. The P2P server may, for example, receive both a desired uplink transmission from the P2P client and the interfering uplink transmission from the WAN UE. Because the identity of the WAN UE is known to the P2P server, i.e., is within the active set of the P2P server, and because the P2P server is in the neighbor set of the serving base station of the WAN UE, the P2P server may identify the interfering WAN UE to the base station BS, and report the interference to the base station BS. Accordingly, the base station may take action, with respect to the WAN UE, to correct the interference by the WAN UE with the P2P communication.

Figure 9:
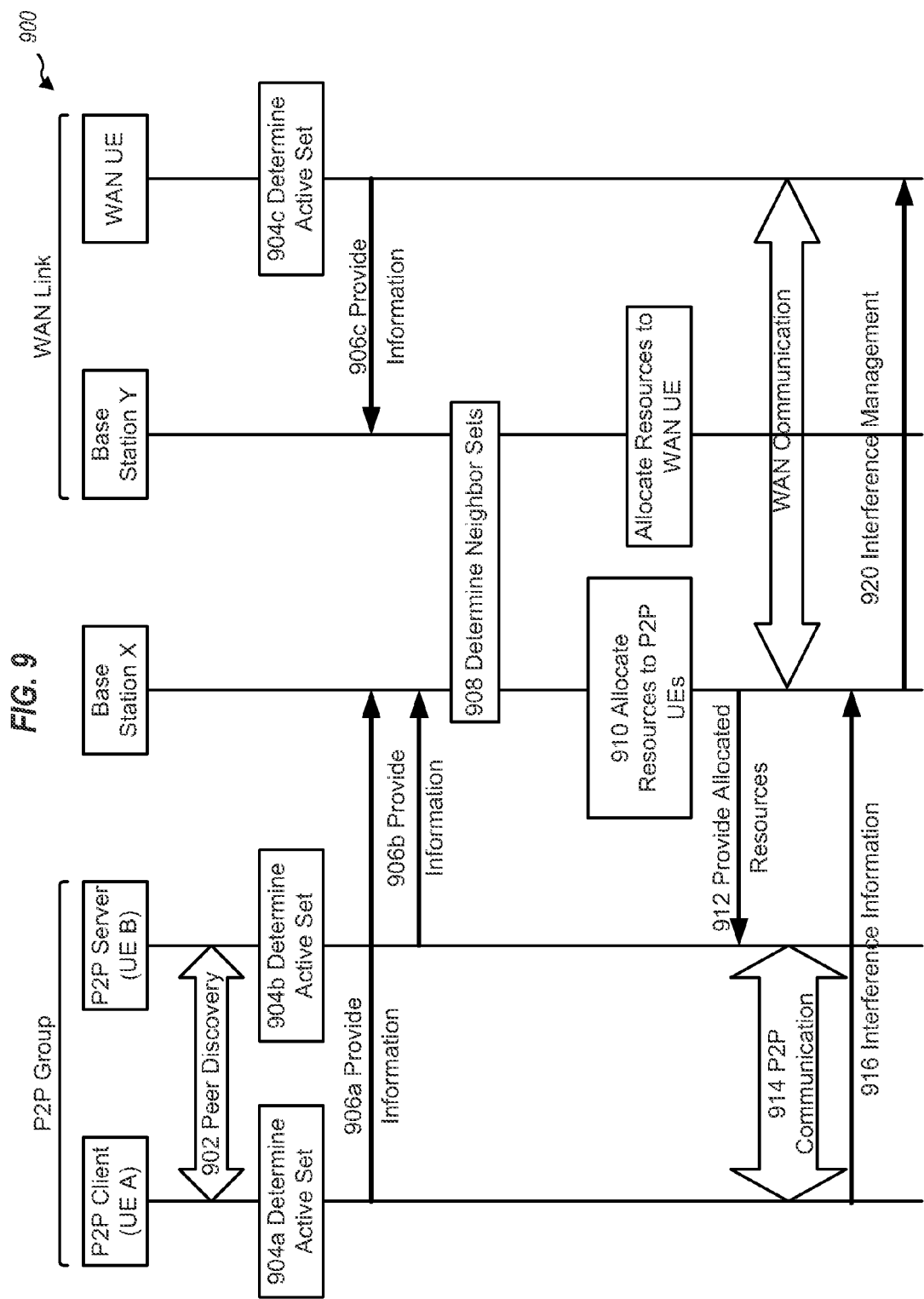
FIG. 9 shows a process for interference management according to one embodiment.

FIG. 9 shows a flow diagram of a process 900 for performing interference management. For simplicity, FIG. 9 shows one P2P group that includes two UEs, A and B, and that is associated with a base station X. FIG. 9 also shows one WAN link between a WAN UE and a base station Y. In general, interference management may be performed for any number of WAN links, any number of P2P links/groups, any number of base stations, any number of WAN UEs, and any number of P2P UEs.

UEs A and B may or may not perform peer discovery, and may, if performed, thereby detect the presence of one another, such as for identification for inclusion in the active set, at step 902. Further, UEs A and B may accordingly desire to establish P2P communication, such as, for example, autonomously or with assistance from WAN 100. UE B may be designated as a P2P server, and UE A may be designated as a P2P client.

The P2P server, P2P client, and WAN UE may determine their respective active sets (steps 904a, 904b, and 904c). The P2P server may make measurements (for example, for channel gain, received power, interference level, and the like) for P2P clients and base stations, and may include P2P clients and base stations meeting inclusion criteria in its active set. The P2P server may take additional measurements, such as based on perceived interference from a PUCCH of an interfering WAN resource, wherein the subject WAN resource may be identified in the active set, regarding its communication with the P2P client. Such measurements at step 604a may include or lead to information about the interfering resource that may distinguish the interfering resource from other devices, such as the received energy of the interfering resource, as may be indicated in LTE by the RB location and/or Zadoff Chu index of the resource(s) that is (are) causing the majority of the interference. As will be understood to those skilled in the art, the RB is a time domain representation of a slot in an LTE subframe, as referenced above, and the Zadoff Chu index is used in LTE in the Primary Synchronization Signal (PSS), physical random access preamble (PRACH), HARQ ACK/NACK responses and sounding reference signals (SRS), to reduce intra-cell interference and to uniquely identify base station transmissions. Thus, the interfering PUCCH may be identifiable by the P2P server based on the RB location and/or Zadoff Chu index of the interfering device, such as may be indicated in the active set of the P2P server. Or, the interfering PUCCH may be unknown to the P2P server thereby necessitating reliance on the neighbor set identification of a base station to identify the interfering resource.

Similarly, the P2P client may make measurements for P2P servers and base stations, and may include P2P servers and base stations meeting inclusion criteria in its active set. Further, the P2P client may take additional measurements, such as based on perceived interference from a PUCCH of an interfering WAN resource, regarding its communication with the P2P server. Such measurements may include indications of the interfering resource, such as the received energy of the interfering resource as may be indicated by the RB and Zadoff Chu index of the resource(s) that is (are) causing the majority of the interference. The interfering PUCCH may be known, such as based on the active set of the P2P client, or may be unknown to the P2P client.

The WAN UE may also make measurements for base stations, P2P servers, and P2P clients and may include base stations, P2P servers, and P2P clients meeting inclusion criteria in its active set. In the design shown in FIG. 9, the P2P server and P2P client may send their active sets to base station X (steps 906a and 906b), and the WAN UE may send its active set to its serving base station (step 906c).

In one design, base stations X and Y may collaborate to determine the neighbor sets of the base stations (step 908), such as to address interference scenarios at the cell edge. In another design, each base station may determine its neighbor set. For example, base station X may determine: (i) its neighbor set based on the active sets of all UEs associated with base station X; and (ii) a neighbor set of the P2P server based on the active sets of the P2P client and other UEs.

Further, for example, base station X may allocate some uplink resources (e.g., resource blocks) to the P2P group for P2P communication (step 910). Base station X may send information regarding the allocated uplink resources to the P2P server (step 912). The P2P server and P2P client may thereafter communicate peer-to-peer based on the allocated uplink resources (step 914). Further, in the event of interference, the P2P server and the P2P client may additionally use the allotted uplink resources, and/or other uplink resources, to communicate an identifier of, and/or an energy signature suitable to allow for identification of, the interfering resource, to base station X, at step 916. As referenced above, the interfering resource may be identified as a member of the active set of one or both of the P2P client and the P2P server, may be identifiable as a member of a neighbor set by base station X based on the PUCCH of the interfering resource as identified by at least one of the P2P server and the P2P client, or may be otherwise identifiable by base station X, such as in the collaborative determination of neighbor sets performed in conjunction with base station Y (as referenced above). In an exemplary embodiment, base station X may, in accordance with the information received at step 916, identify the interfering resource, and may perform interference management, at step 920, for all P2P groups associated with that base station, e.g., P2P groups under the control of, or within the coverage of, the base station.

In general, the interference management may result in any set of controls to mitigate interference, at step 920, as between P2P UEs and WAN UEs. The set of controls may be dependent on which interference mitigation technique(s) are employed, and may include power control, association, subframe usage, resource partitioning, and the like. By way of non-limiting example, the base station of the PUCCH resource reported may use the reported information to identify the particular UE that is causing the interference, and, depending on the severity of the interference being caused to the P2P device, the base station may:

if feasible, ask the interfering UE to reduce its PUCCH transmit power (such as in the event of desensing—as used herein, "desensing" refers to a condition in which a second device is close in distance to a first device, such that the power level of communications of the second device causes the communications of the second device to interfere with communications of the first device);

move the PUCCH of the interfering UE to a different resource block (thereby reducing the leakage into the P2P resource blocks)—as used herein, "leakage" refers to a condition in which the frequencies of a first resource block in a subframe of an LTE radio frame allocated for P2P communication are proximate to a second resource block in the subframe assigned to the PUCCH of a second device, and wherein energy from the PUCCH of the second device thus "leaks" into the first resource block used by the first device (the frequency of the PUCCH causing this interference is referred to as the "leakage frequency");

if the interfering UE is desensing the P2P device, change the subframe of an LTE radio frame over which PUCCH is transmitted to a subframe of the radio frame that is not shared with P2P communication, i.e., have the interfering UE communicate with the base station on a subframe of the radio frame in which P2P communication is not occurring; or ask the P2P device to perform P2P communication on a different subset of subframes of an LTE radio frame, i.e., have the interfering UE communicate with the base station on a subframe subset of the radio frame in which P2P communication is not occurring.

Different interference mitigation techniques may be utilized separately or in combination. For example, power control may be utilized over a short-term time scale, and may be used dynamically. In such an exemplary design, short term power control may be used to mitigate interference between the WAN and P2P UEs (as referenced above, WAN UEs may cause significant interference to the reception of P2P transmissions by nearby P2P servers and/or P2P clients). Such short term, dynamic power control of the PUCCH transmit power of an interfering WAN UE may be indicated by the correspondent base station to the WAN UE in order to mitigate only the most severe interference conditions, or upon reaching interference conditions of a predetermined level as assessed by a P2P UE, for example.

In a power control embodiment, a transmitting node, such as the foregoing WAN UE, may receive power control modification commands from its serving base station. The serving base station may send such power control commands to its WAN UE on, for example, a Physical Downlink Control Channel (PDCCH) in LTE. Such a design may be supported by UEs with capability to receive modification commands from the WAN on downlink resources.

Alternatively, long term modification of the interfering signal, or of the interfered-with signal, such within an allowable frequency band, to a different allowable slot or subframe may provide elimination of the interference. This is illustrated using the exemplary 1 ms LTE subframe, having time slots A and B, and available frequency RBs 1-50 for each of slots A and B, shown in FIG. 10. In the illustration, RBs 1-3 and 48-50 are typically used for PUCCH in WAN communication, and the other RBs are typically used for PUSCH in WAN communication. Of note, vertically adjacent RBs in the illustration use adjacent subcarriers.

Figure 10:
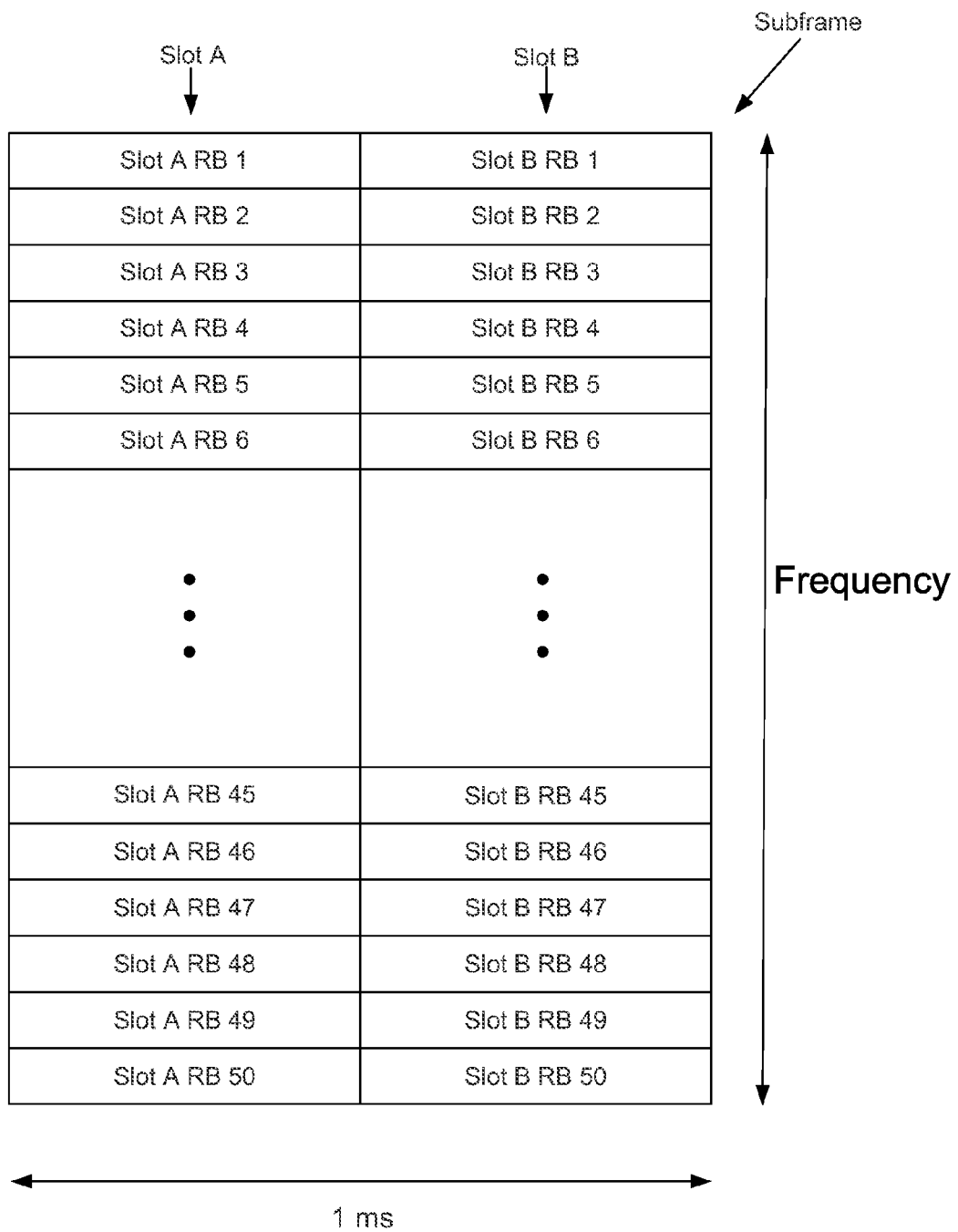
FIG. 10 illustrates modification of the interfering PUCCH frequency in the 1 ms LTE subframe according to one embodiment.

In an embodiment illustrated with reference to FIG. 10, a P2P device may be assigned at least certain of the RBs of slot B (assuming TDM/FDM is employed as illustrated in FIG. 5, a WAN device may also be assigned certain RBs of slot 2). For example, an interference issue may arise when device B of FIG. 6 is assigned RB 47 in slot B, and device C (the WAN device) of FIG. 6 is assigned RB 48 (such as for its respective PUCCH) in slot B. The interference may consequently arise, by way of non-limiting example, because power transmitted by device C leaks from RB 48 to RB 47, where device B is assigned. Device B may identify this problem, and/or the problematic device, by measuring power/Zadoff Chu in RB 46 and RB 48 and therefrom determine that the problem resource is at RB 48. Device B may thus inform the base station 610 about RB 48, and/or about the identity of the device communicating using RB 48. The base station 610 may accordingly mitigate the interference, for example, by reducing device C's power, by reassigning device C to use, for example, RB 49 of slot B (or another RB of slot B non-adjacent to RB 47), by reassigning device C to use a RB in slot A, or by reassigning device C to use a different subframe.

In an exemplary desense case, device C may be assigned RB 1 of slot B, and device B may be assigned RB 47 of slot B. In this instance, RB 1 and RB 47 are not adjacent in frequency (they are separated in frequency by many RBs, as illustrated in FIG. 10), but device C may be so close geographically to device B that device C overpowers device B's receiver. Upon receiving the information regarding the interference and/or the problematic device from device B, the base station 610 may recognize that moving device C to another RB in slot B will not help due to the proximity of devices B and C, and thus the base station 610 may instead move device C to slot A, or to another subframe, or may move device B to another subframe, for example.

Figure 11B:
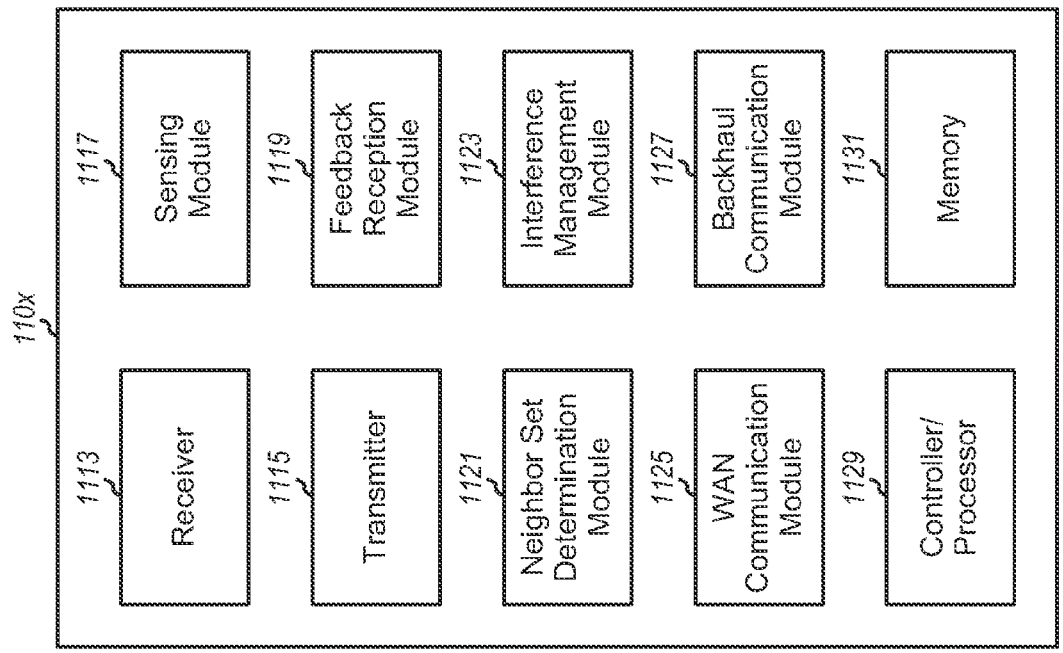
FIG. 11B shows a block diagram of a base station according to one embodiment.
Figure 11A:
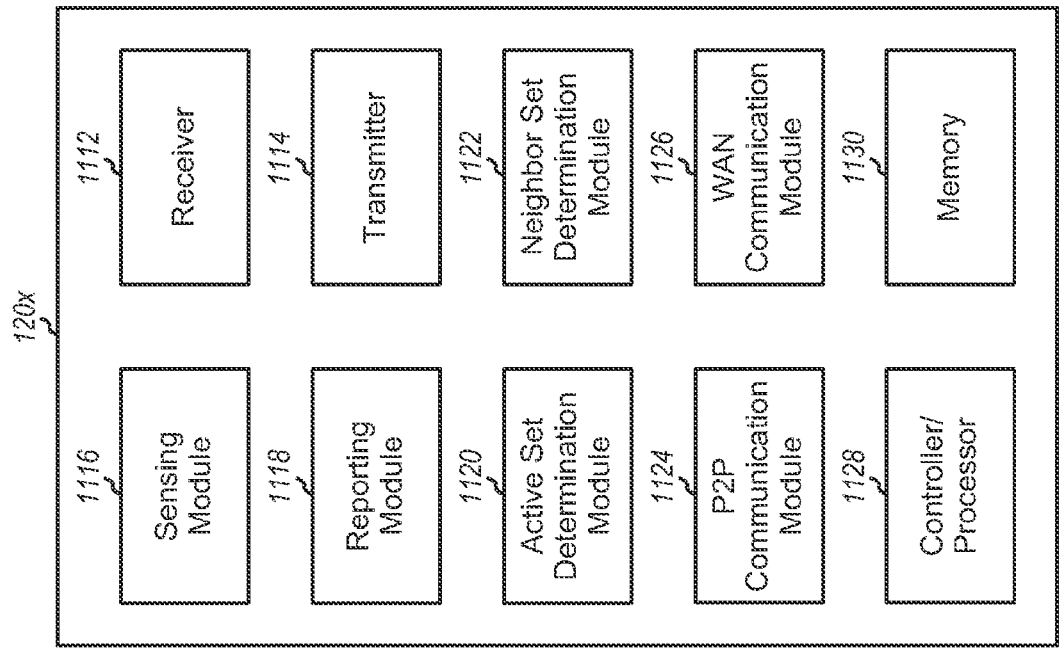
FIG. 11A shows a block diagram of a UE capable of P2P communication according to one embodiment.

FIG. 11A shows a block diagram of a UE 120x capable of P2P communication and WAN communication. Within UE 120x, a receiver 1112 may receive P2P signals transmitted by other UEs for P2P communication, and downlink signals transmitted by base stations for WAN communication. A transmitter 1114 may transmit P2P signals to other UEs for P2P communication and uplink signals to base stations for WAN communication. A sensing module 1116 may detect the presence of other UEs and base stations and may measure channel gains, received power, and interference from and of, for example, the detected UEs and base stations. An active set determination module 1120 may determine an active set of UE 120x based on the measurements made by sensing module 1116. A neighbor set determination module 1122 may determine a neighbor set of UE 120x (if applicable) based on the active sets of other UEs communicating with UE 120x and possibly other UEs. A reporting module 1118 may discern information regarding interference that disturbs direct wireless communication between UE 120x and a corresponding base station and/or another UEs. For example, module 1118 may determine the nature of the interference, i.e., its periodicity, slot, RB or the like; and/or of the nature of the interfering device, i.e., its Zadoff Chu or like signal characteristics. Module 1118 also may send this and other information indicative of the active set, neighbor set, channel gains, and/or of, or of the identity of, an interfering device, for example, to a corresponding base station and/or to other UEs. A P2P communication module 1124 may support P2P communication, e.g., may generate and process signals used for P2P communication. A WAN communication module 1126 may support WAN communication, e.g., generate and process signals used for WAN communication. The various modules within UE 120x may operate as described hereinthroughout. A controller/processor 1128 may direct the operation of various modules within UE 120x. A memory 1130 may store data and program codes for UE 120x.

FIG. 11B shows a block diagram of a base station 110x supporting P2P communication and WAN communication. Within base station 110x, a receiver 1113 may receive uplink signals transmitted by UEs to support WAN communication and P2P communication. A transmitter 1115 may transmit downlink signals to UEs to support WAN and P2P communications. A sensing module 1117 may detect the presence of UEs and may measure channel gains, received power, for example, of the detected UEs. A feedback reception module 1119 may receive reports from UEs, including information regarding interference disturbing direct wireless communication between UEs such as may be generated by reporting module 1118. A neighbor set determination module 1121 may determine a neighbor set of base station 110x, such as, for example, based on the active sets of UEs communicating with base station 110x and possibly other UEs. An interference management module 1123 may perform interference management, and may, for example, modify communications by a WAN UE or P2P UE, pursuant to an indication from a UE module 1118 of interference with a P2P communication. A WAN communication module 1125 may support WAN communication for UEs, and, may for example, generate and process signals used for WAN communication. A backhaul communication module 1127 may support communication with other network entities (for example, base stations) via the backhaul (for coordinated interference management, for example). The various modules within base station 110x may operate as described herein. A controller/processor 1129 may direct the operation of various modules within base station 110x. A memory 1131 may store data and program codes for base station 110x.

The modules within UE 120x in FIG. 11A and the modules within base station 110x in FIG. 11B may comprise processors, electronic devices, hardware devices, electronic components, logical circuits, memories, software codes, or firmware codes, for example, or any combination thereof.

Figure 12A:
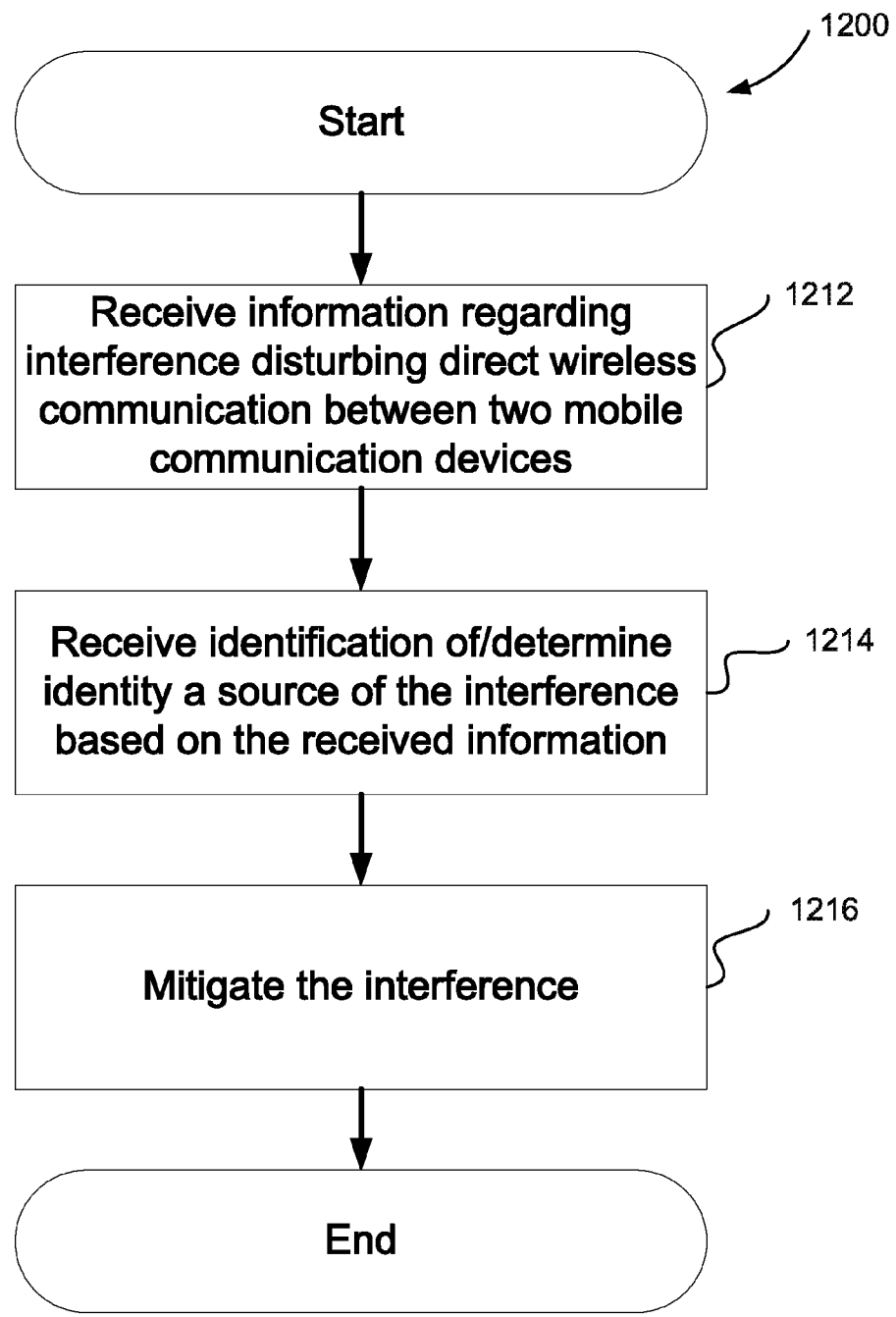
FIG. 12A shows a process for interference management as performed by the base station according to one embodiment.

FIG. 12A shows a process 1200 for performing interference management. Process 1200 may be performed by a base station or other designated WAN network-node entity. A P2P server and at least one P2P client may be known to the base station. The P2P server, using a P2P communication module 1124 (as shown in FIG. 11A), for example, may communicate with the at least one P2P client.

Interference management may be performed by the base station to reduce interference to the P2P server and/or the at least one P2P client. More particularly, one of the P2P devices may experience significant interference from the PUCCH of a nearby WAN UE known to the base station, such as due to leakage of the PUCCH energy into the P2P communication and/or desensing of the P2P communication by the PUCCH energy. The interfered-with P2P device may use the received interfering energy to identify the resource(s) of the PUCCH signal, e.g., the P2P device may identify the RB and/or Zadoff Chu index of the resource that is causing the interference. For example, upon occurrence of leakage, the P2P device can identify the PUCCH tone or resource block of the interfering WAN UE. Alternatively, the interfered-with P2P device may receive the identifying energy, but be unable to identify the resource based on the received energy. For example, upon an occurrence of desensing, the P2P device likely cannot identify directly the interfering WAN UE. In either case, the tracking of the interfering resource, and of the amount of interference caused, may be done over multiple PUCCH periods.

Figure 12B:
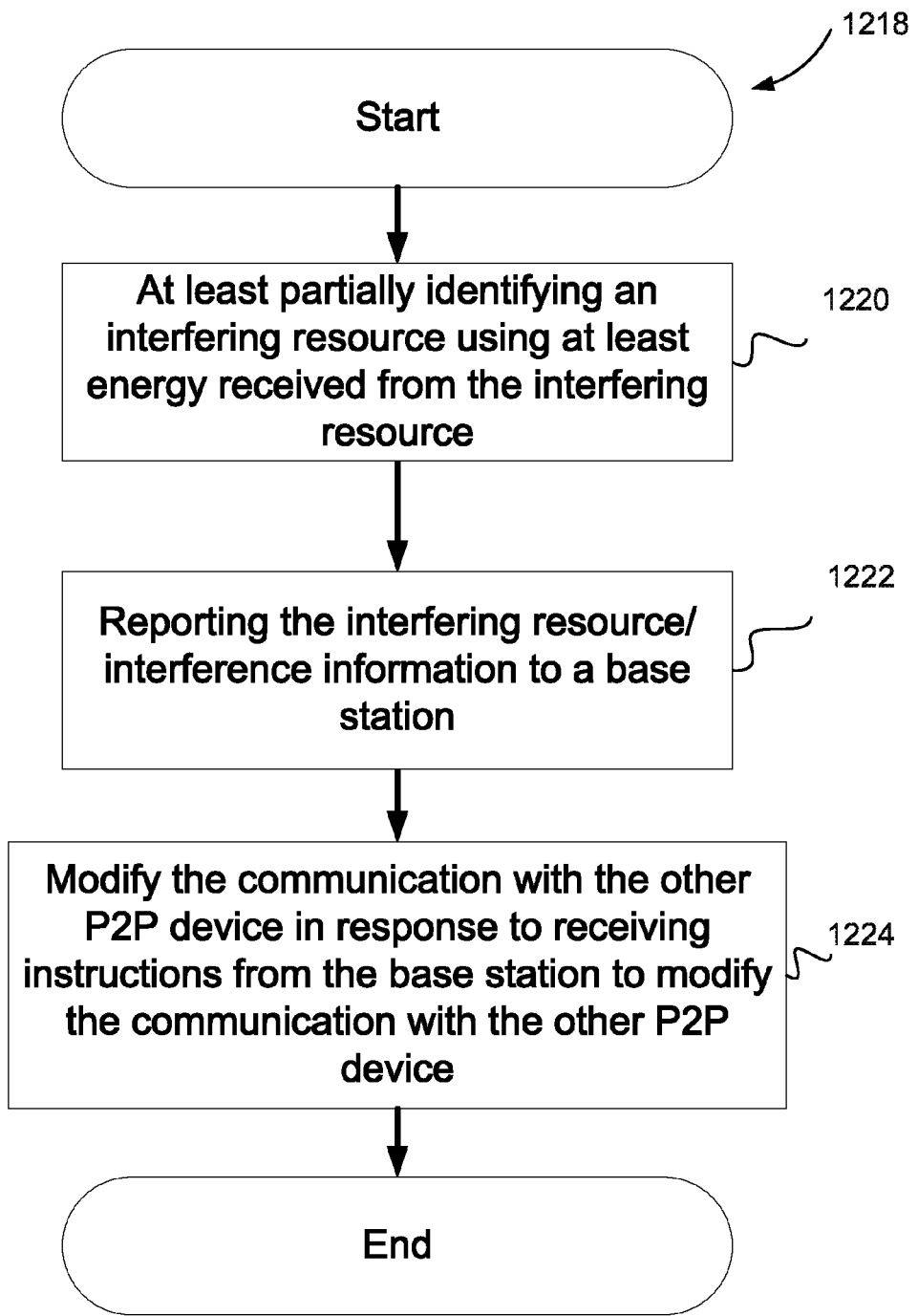
FIG. 12B shows a process for interference management as performed by the mobile device according to one embodiment.

The modules within UE $120x$ in FIG. 11A and the modules within base station $110x$ in FIG. 11B may perform the steps of processes of FIGS. 12A and 12B.

For example, at step 1212, an electrical component of the base station, such as the feedback reception module 1119 of $110x$ shown in FIG. 11B, may receive either the identification of the resource of the PUCCH signal from the interfered-with P2P device, or the identifying energy signature characteristics of the interfering resource, to the extent the resource of the PUCCH signal could not be identified by the P2P device. For example, the feedback reception module 1119 may receive a message, such as from the reporting module 1118, from the interfered-with P2P device at step 1212, indicating the interfering resource, identifying energy characteristics of the interfering resource (e.g., power level; frequency bands on which the interference is present; if the interference is not always present, but instead is periodically present, information describing the periodic interference such as the period, frequency, phase, time when the interference is present, subframes in which the interference is present, etc.), or simply that an interfering resource is interfering. Further included in this interference information received by the base station may be the severity of the interference. If necessary, the feedback reception module 1119 may extract the identification of the interfering resource based on the received identifying energy signature characteristics, and/or may assess, such as based on known geographic locations of UEs in the neighbor set of the base station, or subframe information of WAN UEs, which WAN UE is most likely causing the interference with the P2P communication, at step 1214.

More particularly with respect to step 1214, due to the periodic nature of interference from a WAN UE, the reasons for which are discussed above, the feedback reception module 1119 may review the subframe usage of WAN UEs, and the subframes in which the interference with the P2P communication occurs, at that base station. From that subframe usage and interference information, and based on the periodicity of the interference, the feedback reception module 1119 may determine the identity of the WAN UE communicating on the particular subframes as the interfering resource. Additionally or alternatively, if location information of UEs is available to the base station, the feedback reception module 1119 may, based at least in part on the location information, identify the UE that is located closest to the P2P UE, and that is transmitting PUCCH on the relevant subframe, as the most likely source of the interference.

Further, the feedback reception module 1119 of the base station $110x$, for example, as shown in FIG. 11B and in communication with the reported PUCCH resource, may use the reported information to identify the WAN UE that is causing the interference with the P2P communication. An interference management module 1123 may receive a message identifying the WAN UE and mitigate the interference. Dependent upon the severity of the interference being caused to the P2P device, the interference management module 1123 may mitigate the interference by, at step 1216: instructing the interfering UE to modify its communications (e.g. reduce its PUCCH transmit power); changing the RB used for PUCCH transmission by the interfering UE; changing the subframe over which the PUCCH is transmitted; or instructing the P2P device to communicate on different subframes.

FIG. 12B shows a corresponding process 1218 for performing aspects of interference management at the P2P device (e.g., a first user equipment), which may be communicating with another P2P device (e.g., a second user equipment). At step 1220, an electrical component, such as the reporting module 1118 of a P2P device $110x$ shown in FIG. 11A, may identify the interfering resource (e.g., a third resource equipment) based on information received at sensing module 1116. Or, to the extent the reporting module 1118 cannot identify the interfering resource of a PUCCH signal, the energy signature characteristics of the interfering resource that may distinguish the interfering resource from other devices in LTE (i.e., the RB location; Zadoff Chu index; power level; frequency bands on which the interference is present; if the interference is not always present, but instead is periodically present, information describing the periodic interference such as the period, frequency, phase, time when the interference is present, subframes in which the interference is present, etc.) may be reported by the reporting module 1118 at step 1222. Alternatively, if the reporting module 1118 cannot determine any distinguishing information regarding the interfering resource, the module may simply notify the base station than an interfering resource is interfering at step 1222.

At step 1224, the P2P communications module 1124 of the P2P device $120x$, for example, as shown in FIG. 11B, may modify the communication with another P2P device in response to receiving instructions from the base station to modify the communication with the second user equipment Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

For example, the various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm or process described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on, or transmitted over as one or more instructions or code on, a computer-readable medium, and preferably a non-transitory computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but rather is to be accorded the widest scope consistent with the principles and novel features disclosed herein.

What is claimed is:

1. A method of reducing interference in a wireless system, comprising:
    a mobile device at least partially identifying an interfering resource using at least energy received from the interfering resource, said identifying including identifying that the interfering resource is desensing a receiver of the mobile device and at least one of: a period of the interference, time when the interference is present, or subframes in which the interference is present; and
    the mobile device reporting the interfering resource to a wide area network (WAN) base station for mitigation of the interference, wherein reporting the interfering resource to the WAN base station for mitigation of the interference includes using uplink communications resources allocated by said WAN base station to a peer to peer (P2P) group for P2P communications to report the interfering resource to the WAN base station, said uplink resources allocated by said WAN base station for P2P communication being separate in time or frequency from communications resources allocated for use by WAN user equipment devices for communication with said WAN base station.

2. The method of claim 1, wherein the WAN base station is not a member of said P2P group.

3. The method of claim 1,
    wherein during desensing the mobile device is unable to directly identify an interfering device using the interfering resource; and
    wherein the identifying comprises identifying at least a communication time slot of the interfering resource.

4. The method of claim 1, further comprising the mobile device determining that the interfering resource is periodically interfering.

5. The method of claim 1, wherein said reporting comprises reporting information regarding a period or frequency of the interfering resource to the WAN base station.

6. The method of claim 1, wherein said reporting comprises reporting a severity of the interference.

7. The method of claim 1, wherein said identifying comprises identifying, based on an uplink control channel of the interfering resource, the interfering resource.

8. The method of claim 7, wherein said identifying further comprises identifying a frequency of the uplink control channel as a leakage frequency of the interference.

9. The method of claim 1, further comprising:
    changing to a different subset of subframes of an LTE radio frame in response to a signal from the WAN base station to avoid use of a subframe subset used by an interfering UE causing said desensing.

10. A method of reducing interference in a long term evolution (LTE) wireless system, comprising:
    a first user equipment directly communicating, absent intervening devices and using LTE uplink resources, with a second user equipment;
    the first user equipment experiencing interference from a third user equipment communicating with a wide area network (WAN) base station that degrades the direct communication between the first user equipment and the second user equipment;
    the first user equipment identifying an interfering resource using at least energy received from the interfering resource, said identifying including identifying that the interfering resource is desensing a receiver of the first user equipment and at least one of: a period of the interference, time when the interference is present, or subframes in which the interference is present; and the first user equipment reporting the interfering resource of the third user equipment to the WAN base station for mitigation by the WAN base station of the interference wherein reporting the interfering resource to the WAN base station for mitigation of the interference includes using uplink communications resources allocated by said WAN base station to a peer to peer (P2P) group for P2P communications to report the interfering resource to the WAN base station, said uplink resources allocated by said WAN base station for P2P communication being separate in time or frequency from communications resources allocated for use by WAN user equipment devices for communication with said WAN base station.

11. A first user equipment capable of reducing interference in a wireless system, comprising:
  means for directly communicating using uplink resources with a second user equipment;
  means for:
  identifying interference from a third user equipment communicating with a wide area network (WAN) base station that degrades the direct communication with the second user equipment, said means for identifying at least partially identifying an interfering resource using at least energy received from the interfering resource, said identifying including identifying that the interfering resource is desensing a receiver of the first user equipment and at least one of: a period of the interference, time when the interference is present, or subframes in which the interference is present; and
  reporting the interfering resource to the base station for mitigation by the WAN base station of the interference, wherein reporting the interfering resource to the WAN base station for mitigation of the interference includes using uplink communications resources allocated by said WAN base station to a peer to peer (P2P) group for P2P communications to report the interfering resource to the WAN base station, said uplink resources allocated by said WAN base station for P2P communication being separate in time or frequency from communications resources allocated for use by WAN user equipment devices for communication with said WAN base station.

12. The first user equipment of claim 11, wherein said WAN base station is not a member of said P2P group.

13. An apparatus for reducing interference in a wireless system, comprising:
  a P2P communications module configured to directly communicate using uplink resources with a second user equipment;
  a receiver configured to receive interference from a third user equipment communicating with a wide area network (WAN) base station that degrades the direct communication with the second user equipment; and
  a reporting module configured to identify an interfering resource using at least energy received from the interfering resource, identifying said interfering resource including identifying that the interfering resource is desensing said receiver and at least one of: a period of the interference, time when the interference is present, or subframes in which the interference is present and report the interfering resource to the WAN base station for mitigation by the base station of the interference, wherein reporting the interfering resource to the WAN base station for mitigation of the interference includes using uplink communications resources allocated by said WAN base station to a peer to peer (P2P) group for P2P communications to report the interfering resource to the WAN base station, said uplink resources allocated by said WAN base station for P2P communication being separate in time or frequency from communications resources allocated for use by WAN user equipment devices for communication with said WAN base station.

14. The apparatus of claim 13, wherein the WAN base station is not a member of said P2P group.

15. The apparatus of claim 13,
  wherein during desensing the apparatus is unable to directly identify an interfering device using the interfering resource; and
  wherein the reporting module is configured to identify at least an interference time slot.

16. The apparatus of claim 13, wherein the interference comprises periodic interference.

17. The apparatus of claim 13, wherein identifying characteristics of the interfering resource comprise a period or frequency of the interference.

18. The apparatus of claim 13, wherein identifying characteristics of the interfering resource comprise a severity of the interference.

19. The apparatus of claim 13, wherein identifying characteristics of the interfering resource comprise an uplink control channel.

20. A non-transitory computer-readable medium associated with a first user equipment comprising processor executable code, the code comprising:
  code for causing at least one processor to directly communicate using uplink resources with a second user equipment;
  code for causing the at least one processor to identify an interfering resource using at least energy received from the interfering resource, said identifying including identifying that the interfering resource is desensing a receiver of the first user equipment and at least one of the period of the interference, time when the interference is present or subframes in which the interference is present; and
  code for causing the at least one processor to report the interfering resource to a wide area network (WAN) base station for mitigation by the base station of the interference, wherein reporting the interfering resource to the WAN base station for mitigation of the interference includes using uplink communications resources allocated by said WAN base station to a peer to peer (P2P) group for P2P communications to report the interfering resource to the WAN base station, said uplink resources allocated by said WAN base station for P2P communication being separate in time or frequency from communications resources allocated for use by WAN user equipment devices for communication with said WAN base station.

21. The non-transitory computer-readable medium of claim 20, wherein the WAN base station is not a member of said P2P group.

22. The non-transitory computer-readable medium of claim 20, wherein during desensing the first user equipment is unable to directly identify an interfering device using the interfering resource; and
  wherein identifying the interfering resource comprises identifying at least an interference time slot.

23. The non-transitory computer-readable medium of claim 20, wherein the interference comprises periodic interference.

24. The non-transitory computer-readable medium of claim 20, wherein the code for causing the at least one processor to report the interfering resource includes code for causing the at least one processor to report a severity of the interference.

25. The non-transitory computer-readable medium of claim 20, wherein the identifying characteristics comprise an uplink control channel.

26. A non-transitory computer-readable medium for use in a mobile device, the non-transitory computer-readable medium comprising processor executable code, the code comprising:
   code for causing at least one processor to at least partially identify an interfering resource using at least energy received from the interfering resource, said identifying including identifying that the interfering resource is desensing a receiver of the mobile device and at least one of: a period of the interference, time when the interference is present, or subframes in which the interference is present; and
   code for causing the at least one processor to report the interfering resource to a wide area network (WAN) base station for mitigation of the interference, wherein reporting the interfering resource to the WAN base station for mitigation of the interference includes using uplink communications resources allocated by said WAN base station to a peer to peer (P2P) group for P2P communications to report the interfering resource to the WAN base station, said uplink resources allocated by said WAN base station for P2P communication being separate in time or frequency from communications resources allocated for use by WAN user equipment devices for communication with said WAN base station.

* * * * *